United States Patent
Bailliard et al.

(10) Patent No.: US 10,239,487 B2
(45) Date of Patent: Mar. 26, 2019

(54) SENSOR DEVICE AND DEVICE FOR CHECKING THE OPERATIONAL CONDITION OF A HARNESS OF A SAFETY SEAT

(71) Applicant: BLUEBEEP, Male (FR)

(72) Inventors: Laurent Bailliard, Paris (FR); Louis Develay, Male (FR); Edouard Dupont-Madinier, Neuilly sur Seine (FR); Patrick Herbault, La Garenne Colombes (FR)

(73) Assignee: BLUEBEEP, Male (FR)

( * ) Notice: Subject to any disclaimer, the term of this patent is extended or adjusted under 35 U.S.C. 154(b) by 0 days.

(21) Appl. No.: 15/550,930

(22) PCT Filed: Feb. 10, 2016

(86) PCT No.: PCT/EP2016/052847
§ 371 (c)(1),
(2) Date: Aug. 14, 2017

(87) PCT Pub. No.: WO2016/128478
PCT Pub. Date: Aug. 18, 2016

(65) Prior Publication Data
US 2018/0043860 A1   Feb. 15, 2018

(30) Foreign Application Priority Data

Feb. 12, 2015 (FR) .................................. 15 00273
Feb. 12, 2015 (FR) .................................. 15 00274
Sep. 3, 2015 (FR) .................................. 15 01824

(51) Int. Cl.
*G01L 1/00* (2006.01)
*B60R 22/48* (2006.01)
(Continued)

(52) U.S. Cl.
CPC ............ *B60R 22/48* (2013.01); *B60N 2/2812* (2013.01); *B60R 21/01544* (2014.10);
(Continued)

(58) Field of Classification Search
CPC ....... B60R 22/48; B60R 22/105; B60R 22/12; B60R 2022/485; B60N 2/2812;
(Continued)

(56) References Cited

U.S. PATENT DOCUMENTS 4,015,860 A *  4/1977  Tisell .................. B60R 22/1951
                                                      280/806
5,086,785 A    2/1992  Gentile et al.
(Continued)

FOREIGN PATENT DOCUMENTS

FR       2 897 936 A1    8/2007
WO       WO 98/51545 A1  11/1998
(Continued)

OTHER PUBLICATIONS

International Search Report as issued in International Patent Application No. PCT/EP2016/052847, dated Apr. 22, 2016.

*Primary Examiner* — Max H Noori
(74) *Attorney, Agent, or Firm* — Pillsbury Winthrop Shaw Pittman LLP

(57) ABSTRACT

A device for controlling the correct operating state of a restraining harness, intended for a safety seat, including at least one retaining strap that is under tension when the harness is in the state of restraining the occupant, the device being intended to be disposed in a predefined area of the latter, the device including: at least one sensor device including an elongate flexible element that is suitable for being positioned on the strap, and in particular rigidly connected thereto in the predefined area, and that is provided with a measuring system to measure, in the predefined area, (Continued)

Figure 13:
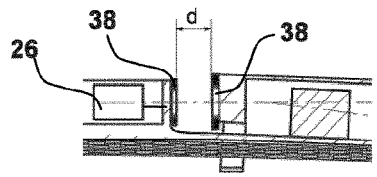

at least a level of bending and/or tilting of the strap, a device to collect values linked to the level of bending and/or tilting, and internal or external device configured to analyze the values and of communicating with a receiver for receiving information on the operating state of the retaining harness.

26 Claims, 7 Drawing Sheets

(51) Int. Cl.
  *B60R 22/10* (2006.01)
  *B60R 22/12* (2006.01)
  *B60R 21/015* (2006.01)
  *B60N 2/28* (2006.01)
  *G01C 9/00* (2006.01)
  *G01L 5/10* (2006.01)

(52) U.S. Cl.
  CPC ............ *B60R 22/105* (2013.01); *B60R 22/12* (2013.01); *G01C 9/00* (2013.01); *G01L 5/102* (2013.01); *G01L 5/105* (2013.01); *B60N 2002/2815* (2013.01); *B60R 2022/485* (2013.01)

(58) Field of Classification Search
  CPC ... B60N 2002/2815; G01C 9/00; G01L 5/102; G01L 5/105
  USPC ......................................................... 73/812
  See application file for complete search history.

(56) References Cited

U.S. PATENT DOCUMENTS

| | | | |
|---|---|---|---|
| 5,157,372 A | 10/1992 | Langford | |
| 8,272,689 B2* | 9/2012 | Biaud | B60N 2/2812 |
| | | | 297/250.1 |
| 2010/0253498 A1 | 10/2010 | Rork et al. | |
| 2014/0085070 A1* | 3/2014 | Schoenberg | B60R 22/48 |
| | | | 340/457.1 |
| 2015/0091348 A1* | 4/2015 | Juchniewicz | B60N 2/2887 |
| | | | 297/256.16 |

FOREIGN PATENT DOCUMENTS

WO    WO 2007/115301 A2    10/2007
WO    WO 2013/055810 A1    4/2013

* cited by examiner

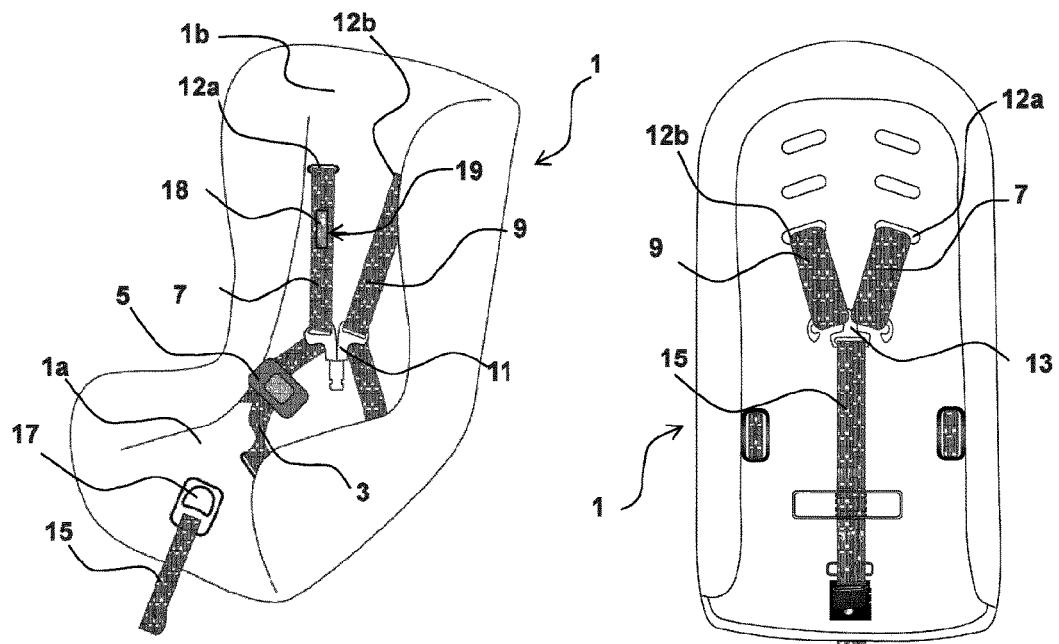
FIG 1
FIG 2
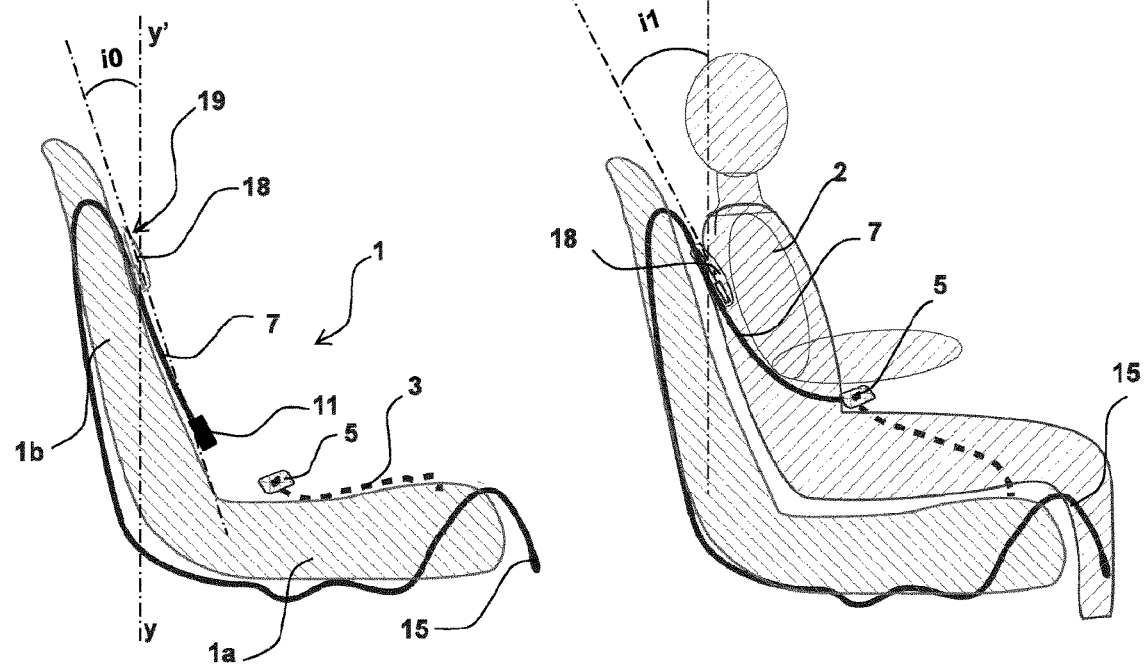
FIG 3
FIG 4

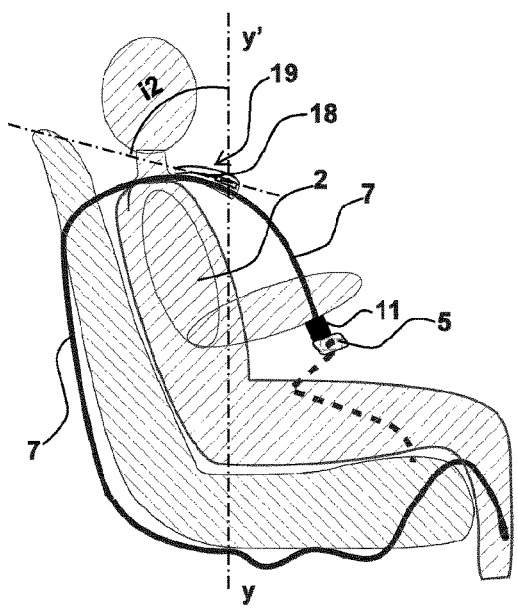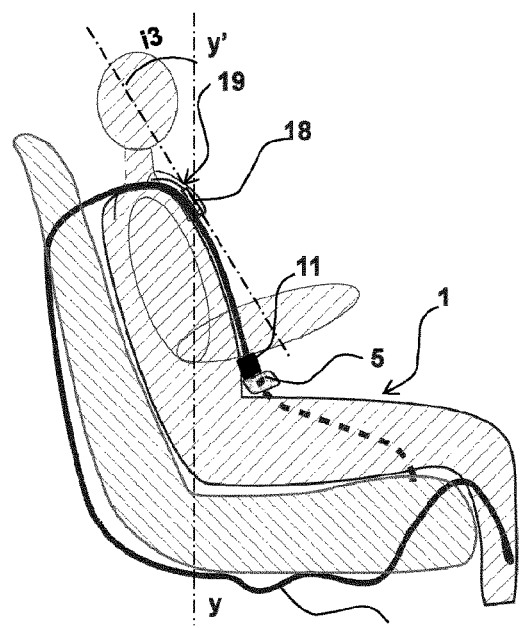
FIG 5  FIG 6
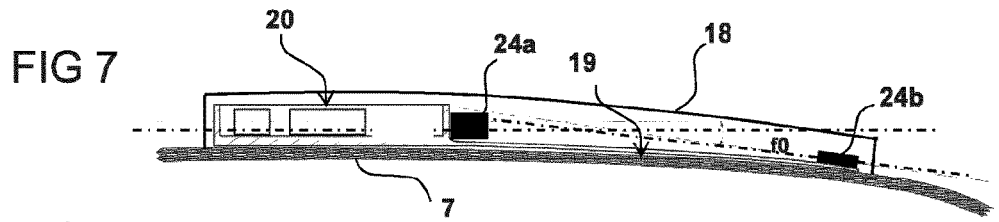
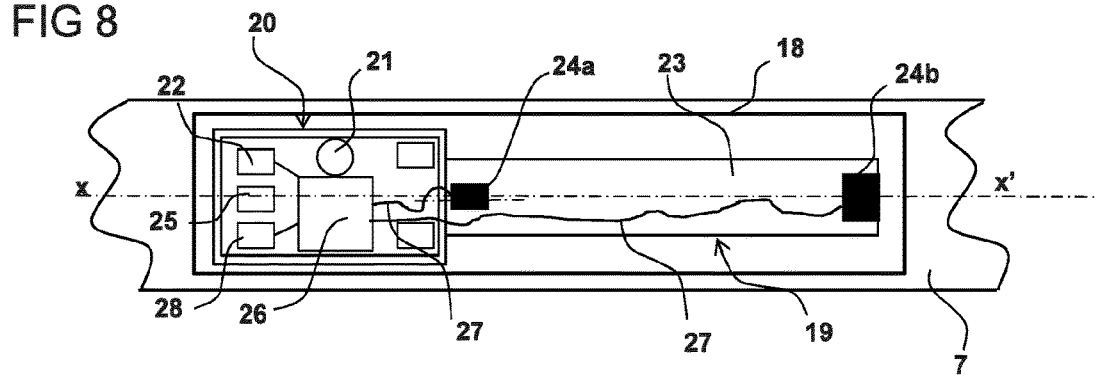
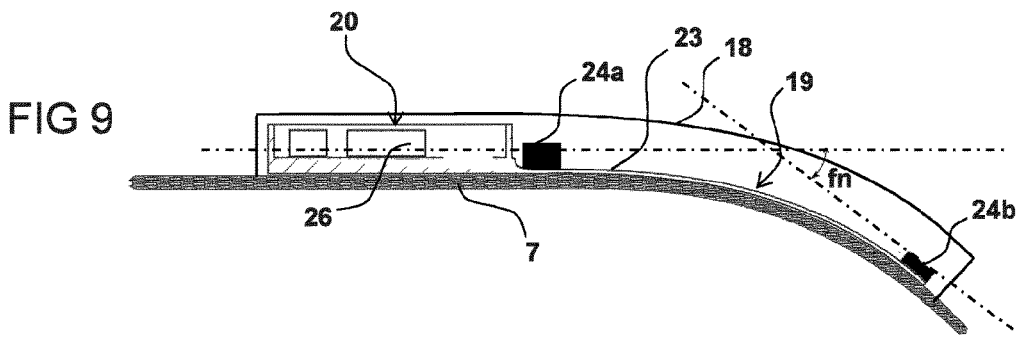

SENSOR DEVICE AND DEVICE FOR CHECKING THE OPERATIONAL CONDITION OF A HARNESS OF A SAFETY SEAT

CROSS-REFERENCE TO RELATED APPLICATIONS

This is the U.S. National Stage of PCT/EP2016/052847, filed Feb. 10, 2016, which in turn claims priority to French Patent Application No. 15/00273, filed Feb. 12, 2015, French Patent Application No. 15/00274, filed Feb. 12, 2015 and French Patent Application No. 15/01824, filed Sep. 3, 2015 the entire contents of all applications are incorporated herein by reference in their entireties.

The present invention concerns a device for checking the correct operational condition of a harness of a safety seat, in particular of a child's car seat, when an occupant is sitting in it. The present invention also concerns a sensor device for the implementation of such a checking device.

In the motor vehicle field various systems are known which enable it to be checked that the devices intended to hold a child in a car seat using a harness are being used correctly.

It will be noted that most harnesses intended to be fitted to children's car seats include a first central strap, called a crotch strap, which is attached by one of its ends to the seat, and which passes between the legs of the child, and ends at its other end with a locking buckle, intended to receive an end of two other straps, called retaining straps, which are positioned symmetrically relative to the seat, and which hold the child in position on the seat, and then join up in the bottom of the seat with a strap, called a tension belt, the tension of which causes that of the retaining straps.

Various systems are also known which, to check that a child is correctly attached in their seat, check that the retaining straps are indeed engaged on closure, in the locking buckle. Such systems prove to be unable to check that the child is held correctly in the seat throughout an entire journey, since they are not able to detect and signal a malfunction if, for example, one of the straps of the harness is released for one reason or another.

Systems are also known which can detect the presence of a child on a seat by means of a feeler positioned on the seat and which, furthermore, can check that the harness's locking buckle is correctly closed by measuring the angle formed by the crotch strap and the case of the locking buckle. As with the previous one, such systems cannot detect all malfunctions which result in a relaxation of the tension of the retaining straps in the course of use.

Systems are also known, through application WO 2007/115301, which check that the devices which hold a child in a car seat when the child is put into it are being used correctly, by checking the pressure exerted by the locking buckle against the seat. These devices are also unable to detect malfunctions relating to a lack of tension in the retaining straps in the course of a journey.

Finally a device is known, through application WO 98/51545, for measuring the tension of a retaining strap holding a passenger in a car seat which makes, use of a deflector device, which forces the strap to follow a determined path such that, when the tension of the strap increases the deflector device is displaced, and this displacement is detected by a sensor.

It will also be observed that all the above-mentioned checking devices require, to be installed in a specific car seat, that substantial modifications are made to this seat beforehand, and they then require that new tests are conducted on the modified seat, these tests being necessary for it to be accepted by the official safety control bodies.

Another disadvantage, which is inherent to the various systems mentioned above, is that none of them is able to communicate with the vehicle's navigational control instruments.

The aim of the present invention is to propose a device allowing continuous checking, for the entire period during which an occupant, and in particular a child, is occupying a car seat, that this occupant is being held correctly, where this system can also be installed in a safety seat of any type, without requiring that specific adaptive modifications are made to it. Additionally, if the occupant is no longer being held, or is being held incorrectly, the checking system according to the invention can transmit a warning, firstly to the vehicle's navigational control instruments, and secondly to additional receiver systems which users are able to use, such as for example key fobs or smartphones.

Another purpose of the present invention is a device for checking that a securing harness, intended for a safety seat, in particular a child's seat, including at least one retaining strap subjected to tension when the harness is in the state of holding an occupant, is in a correct operational condition, where the said device is intended to be installed in a determined area of this strap, characterised by the fact that it includes:
  at least one sensor device including an elongated, flexible element which can be positioned on the said strap, and in particular can be securely connected to it, in the said determined area, which has measuring means able to measure, in this said determined area, at least one level of flexion and/or inclination of the said strap,
  means able to obtain values relating to this level of flexion and/or inclination,
  internal or external means able to analyse these values and to communicate to receiver means data concerning the operational condition of the said securing harness.

According to the invention, the retaining strap will be a shoulder strap, and the said determined area will be close to a location where it is intended for the strap to be pressing against the shoulder of the occupant.

The sensor device will preferentially be associated with an electronic circuit, and the elongated, flexible element will be attached to it, in particular as an extension to it, both of these elements being contained in a flexible, elastic envelope so as to form a module which can be immobilised relative to the strap. One end of this device may include means able to attach it, in particular using a strap, to a headrest of the child seat.

The flexible envelope may have elasticity such that, when it is under no stress, it has an unbent shape. This elasticity may be at least partly communicated to it by an additional spring element, in particular one which is incorporated in its flexible envelope. This spring element may consist of at least one snap ring made of synthetic fibre.

The checking device according to the invention may include electronic management means, particularly of the microcontroller type, containing a program to control the various associated sensors, and in particular a self-test program intended to be run on each new use of the child seat.

It may include means for remote communication with receiver means, in particular of the Bluetooth type.

It may also include means able to take into account the physical characteristics of the occupant, in particular of the child, and above all their size and/or their physical build.

Another purpose of the present invention is a sensor device intended to implement a checking device according to the invention. This sensor device may be incorporated in a retaining strap.

The said measuring means may also include at least one inclination sensor, and at least one inclination sensor may consist of an accelerometer.

In a preferred embodiment of the invention the sensor device will include two inclinometers installed roughly at the respective ends of the elongated, flexible element, where the difference between the two values delivered by these inclinometers gives a value of the retaining strap's level of flexion. At least one additional inclinometer may be attached to them, which will preferentially be installed between the first ones.

In one embodiment of the invention the flexible element may include, at one end, a target in which one area becomes separated from a reference area when it is subjected to flexion, and where measuring means are installed to measure the distance between the target and the said reference area. The flexible element may be formed by an elongated sleeve, the upper and lower walls of which will be kept apart by separating elements, with the target installed in a portion of the sleeve distant from the strap. These measuring means can include a laser diode device.

The measuring means can also include two electrodes installed on the target and in the reference area which constitute a capacitance with the air which separates them as a dielectric, and also means for measuring the value of this capacitance.

The flexible, elongated element may also be covered with a coating, such that its electrical resistance varies when it is bent. This electrical resistor may consist of a coating containing embedded conducting particles which, when it is appreciably rectilinear, will give it a given resistance and, when it is curved, a resistance of another value. It may include means to measure the value of the said resistance.

Finally, the elongated, flexible element may include at least one capacitive sensor.

Another object of the present invention is a safety seat, in particular a car seat, including a checking device and possibly a sensor device as described above.

Figure 14:
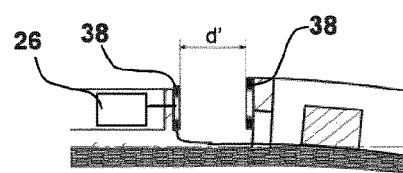
Figure 10:
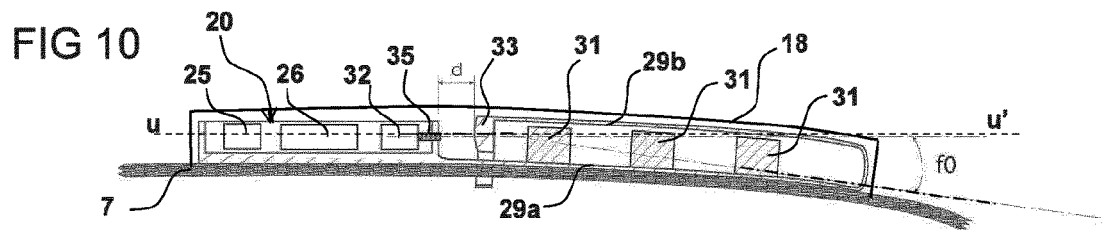
Figure 11:
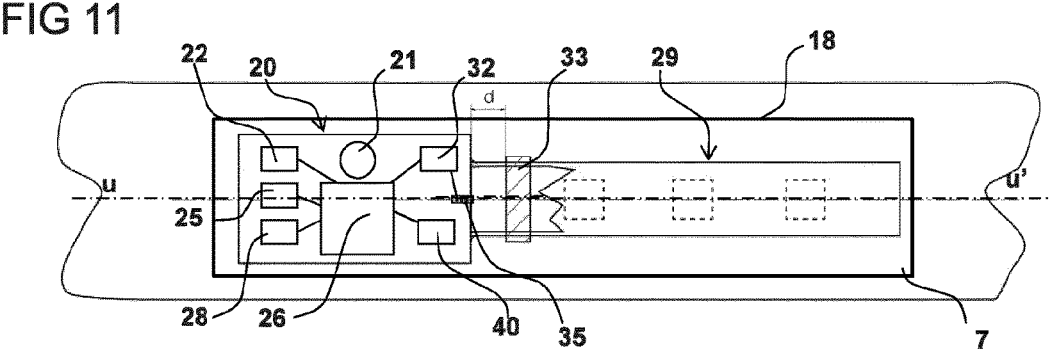
Figure 15:
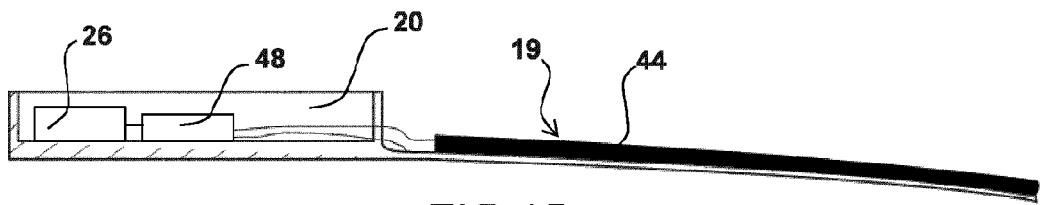
Figure 16:
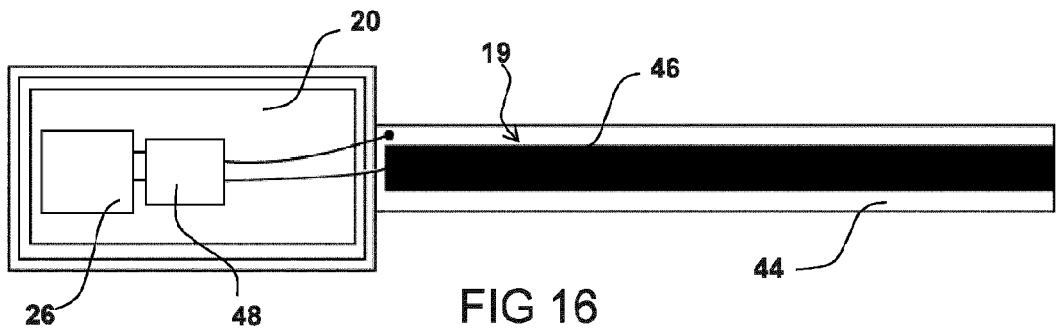
Figure 17:
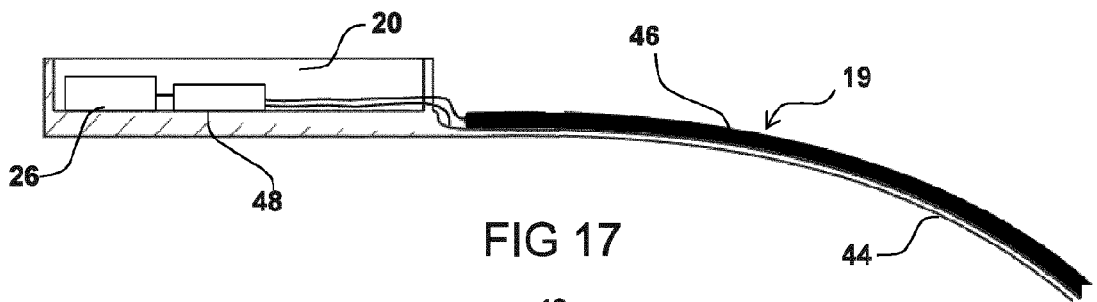
Figure 18:
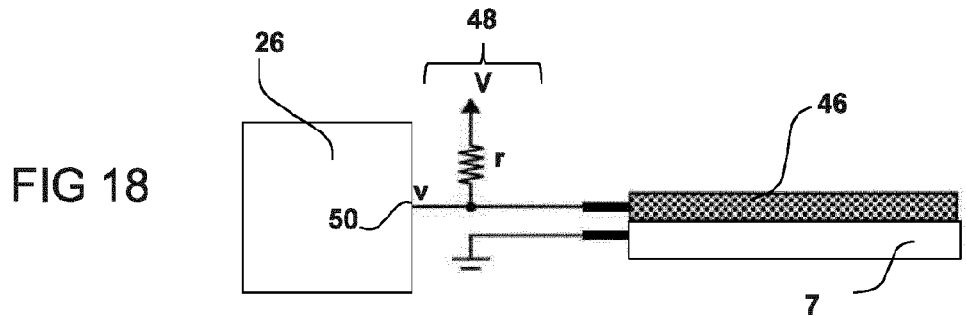
Figure 21A:
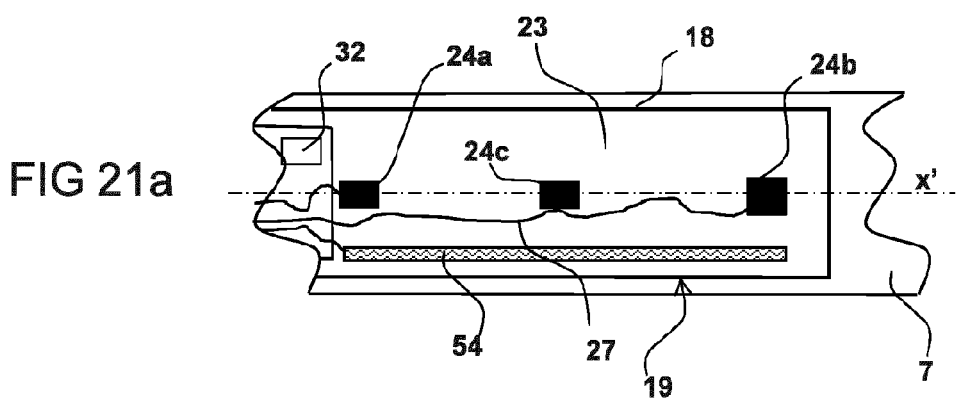
Figure 20:
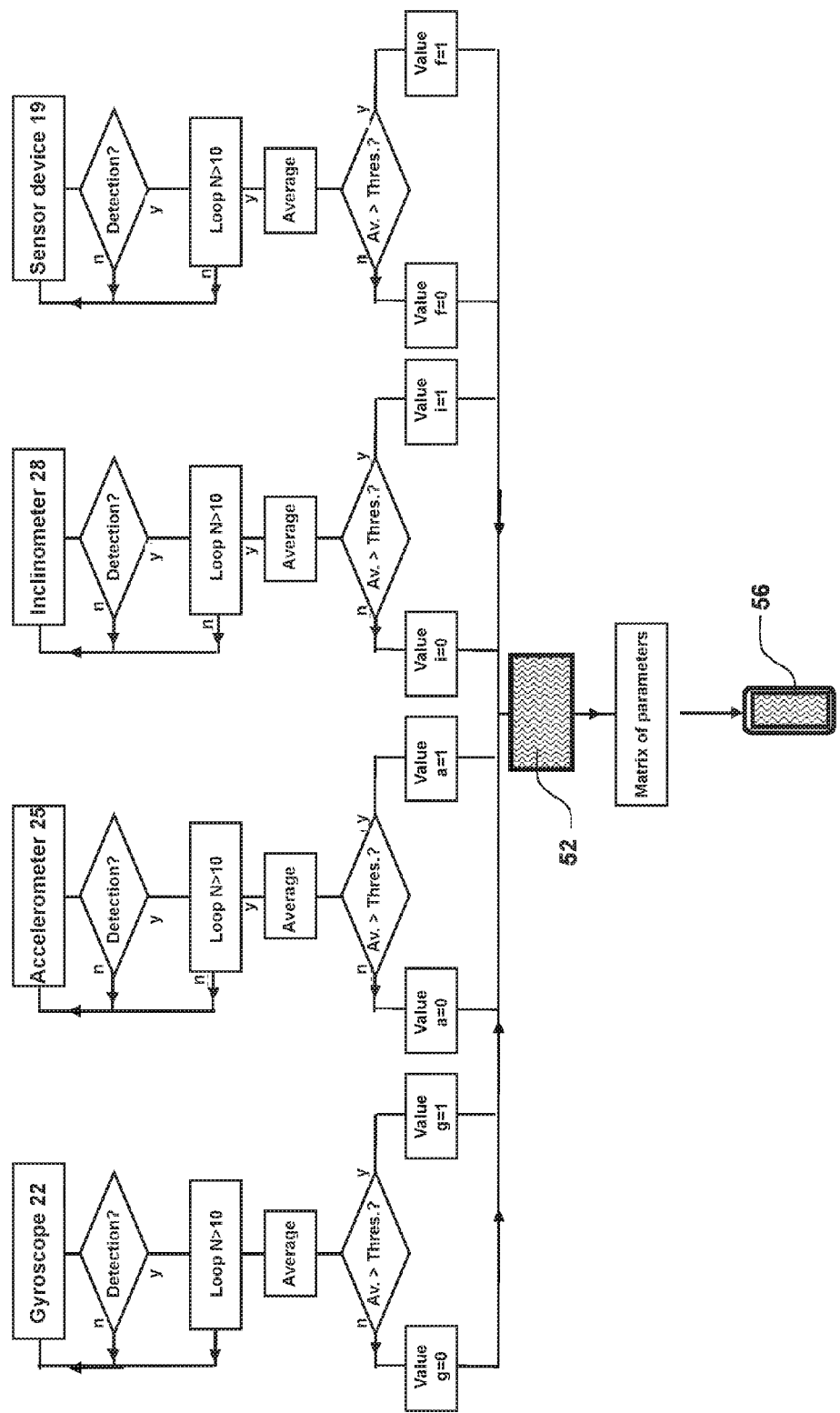
Figure 22:
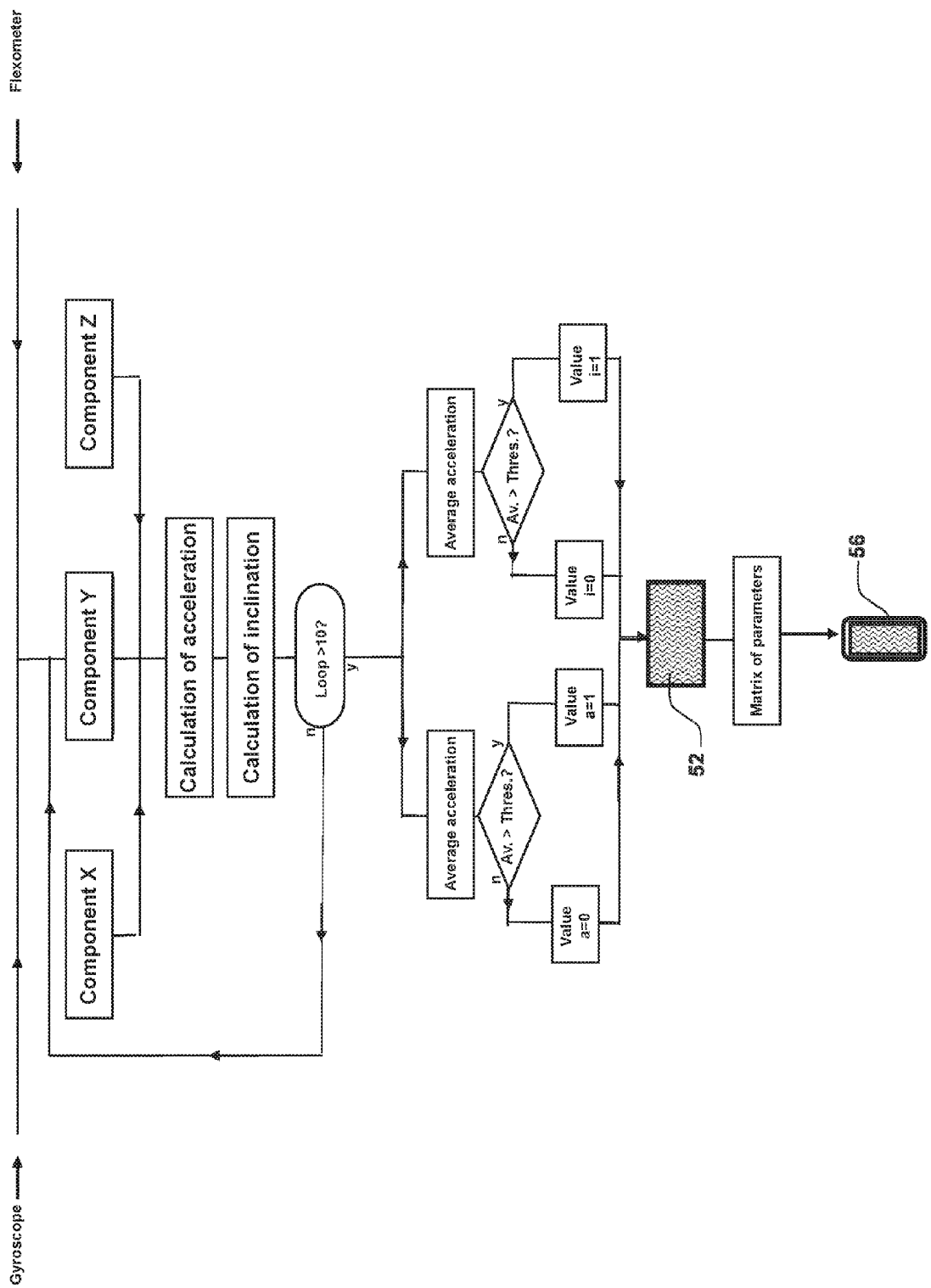
Figures 19, 23A:
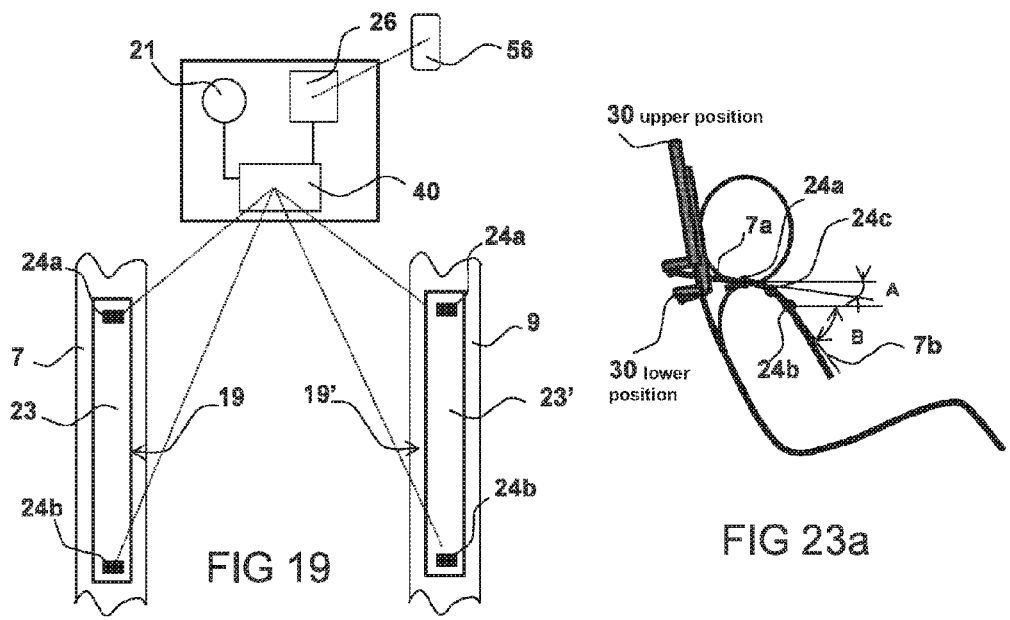
Figures 23B, 23C:
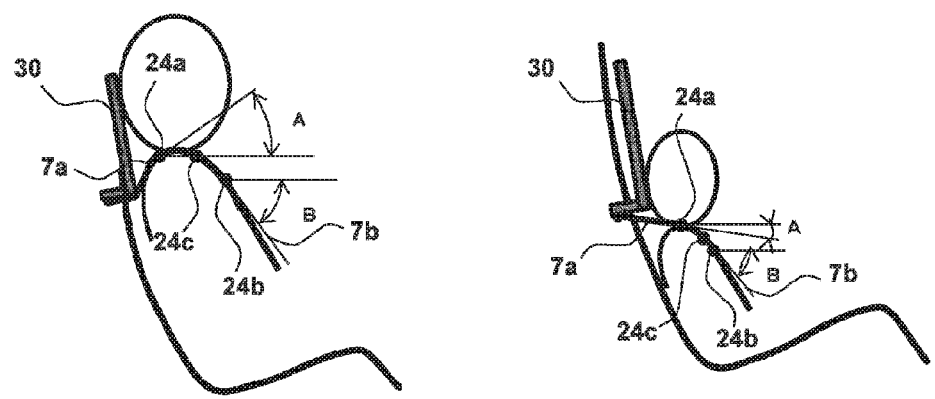
Figure 21B:
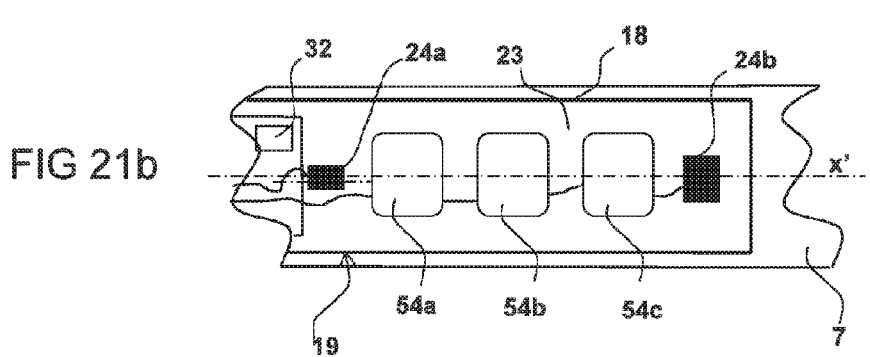

Ways of executing the present invention will be described below, as non-restrictive examples, with reference to the appended illustration, in which:

FIG. 1 is a perspective view of a child's car seat which is fitted with a checking device according to the invention, represented before its securing harness is locked, FIG. 2 represents a rear view of the car seat represented in FIG. 1, FIG. 3 is a profile view of the car seat represented in FIGS. 1 and 2, FIG. 4 is a view of the car seat represented in FIG. 3, in which a child has been placed, but is not yet strapped in, FIG. 5 is a view of the car seat represented in FIG. 4 after the straps have been passed over the shoulders of the child, FIG. 6 is a view of the car seat represented in FIG. 5 after the child's retaining straps have been tightened, FIGS. 7 and 9 are cross-section views of a first embodiment of a sensor device belonging to a checking device according to the invention, respectively before and after flexion of the retaining strap on which it is positioned, FIG. 8 is a top view of the sensor device represented in FIGS. 7 and 9, FIGS. 10 and 12 are cross-section views of a second embodiment of a sensor device belonging to a checking device according to the invention, respectively before and after flexion of the retaining strap on which it is positioned, FIG. 11 is a top view of the sensor device represented in FIGS. 10 and 12, FIGS. 13 and 14 are schematic views of details showing a method of measuring flexion by measuring a capacitance, FIGS. 15 and 17 are cross-section views of a third embodiment of a sensor device belonging to a checking device according to the invention, respectively before and after flexion of the retaining strap on which it is positioned, FIG. 16 is a top view of the sensor device represented in FIGS. 15 and 17, FIG. 18 is a schematic view of an example of a flexion measurement provided by the sensor device represented in FIGS. 15 to 17, FIG. 19 is a view and a schematic of a variant embodiment of a sensor device according to the invention, FIG. 20 is a flow chart representing a first example of a method of operation of the present invention, FIGS. 21a and 21b are partial top views of sensor devices using capacitive sensors, FIG. 22 is a flow chart representing a second example of a method of operation of the present invention, FIGS. 23a to 23c are schematic views showing the influence of the setting of the seat headrest and of the size of the child on the inclination of the rear portion of the retaining strap.

FIGS. 1 to 6 represent a first embodiment of the present invention, in which a child's car seat 1 consists principally of a shell comprising a base 1a, and a backrest 1b. The shell has a harness which consists mainly of a first central crotch strap 3 which is attached by one of its ends to base 1a and which includes, at its other end, a locking buckle 5, and two lateral retaining straps 7 and 9, which are positioned symmetrically relative to the shell. The first ends of each of these straps 7, 9 are joined in a hook 11 which can work in tandem with additional means of locking buckle 5, so that they can be locked in it in a position which immobilises a child in seat 1.

The other respective ends of these two straps 7 and 9 traverse apertures 12a, 12b located in the upper portion of the shell, and then join one another on the reverse side of it in a connection device 13, to which a traction belt 15 is attached which traverses the shell and then emerges from it through blocking means 17.

In the present embodiment strap 7 has, in its upper portion, i.e. in an area close to aperture 12a through which it traverses backrest 1b, a case 18, made of a flexible, deformable material, which contains electronic measuring means and also a sensor device 19 according to the invention.

Case 18 can be attached to strap 7 by all means, and in particular by stapling, clipping, bonding, trapping, etc. It can also be incorporated, in particular during manufacture, in the strap. Case 18 can preferentially be attached to an envelope surrounding the strap, where this envelope is held in place by a link close to the upper portion of the seat or of headrest 30 of the seat, as represented in FIGS. 23a to 23c.

As represented in FIGS. 7 to 9, case 18 contains an electronic circuit 20 which is extended by a flexible tongue 23. The electronic circuit, which includes electric supply means, consisting for example of a lithium battery 21, includes several sensors, namely a gyroscope 22, an accelerometer 25 and an inclinometer 28. Operational management of these various sensors, and that of sensor device 19, is performed by a microcontroller 26 which has programming means able to implement the checking device according to the invention.

Sensor device 19 which, inside case 18, extends electronic circuit 20, includes flexible tongue 23 which supports two accelerometers 24a and 24b, which include, in a known manner, an inclinometer function which will be used in the present case. The two accelerometers are preferentially installed roughly at the ends of flexible tongue 23, and are connected to microcontroller 26 by a wired link 27. As represented in FIGS. 7 and 9, each accelerometer measures its respective inclination fo and fn relative to the same reference, and microcontroller 26 is able to determine easily, using the difference of these two values, value f of the flexion adopted by flexible tongue 23, and therefore the flexion adopted by strap 7, i.e. f=fn−f0.

In a simplified embodiment of the present invention either an inclinometer or a sensor device may simply be used. It will be understood that the accuracy of the data available to the user will then of course be lower, but it may prove of interest for simple, low-cost embodiments.

As represented in FIG. 21a, it is also possible to use a third accelerometer 24c, which will be installed between accelerometers 24a and 24b. This accelerometer will enable microcontroller 26 to factor into its management process the size of the child who is placed in the seat, as explained below.

Figure 12:
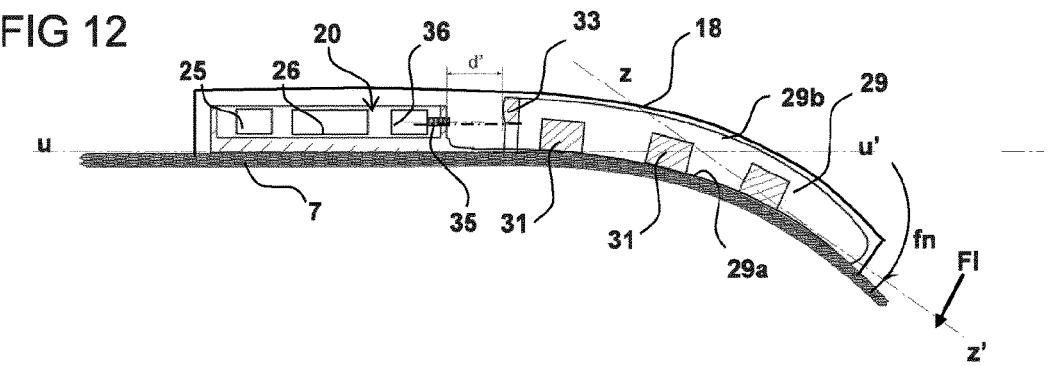

A sensor device 19 using measuring means different from those described above could of course be used. Thus, in a second implementation of the present invention, which is represented in FIGS. 10 to 12, electronic circuit 20 is extended by a sensor device 19 including a sheath 29 made of a deformable, elastic material such as, for example, polyamide, polyether, polyester, isocyanate, etc. This sheath 29 is sufficiently rigid that, when not subject to any stress, it can regain its rectilinear shape, as represented in FIG. 10. Sheath 29 includes a lower wall 29a which is kept in contact with strap 7 and an upper wall 29b. The inner face of lower wall 29a receives spreaders 31, the function of which is to keep lower wall 29a and upper wall 29b separated.

The sensor device has means enabling the existing distance between a target 33, positioned at its end close to electronic circuit 20, and a fixed portion of the latter, called the reference area, to be measured, as represented in FIGS. 10 to 12. These means consist, for example, of a laser diode 35 installed such that axis uu' of its beam is roughly perpendicular to target 33 when the sensor device is only slightly curved. Laser diode 35 is connected to an interface connected to microcontroller 26 which can determine distance d between it and target 33.

This being so, it will be understood that when a flexion force F1 is exerted on strap 7 sensor device 19, lower face 29a of which is securely connected to the latter, is deformed, as represented in FIG. 12, and the separation between laser diode 35 and target 33 increases and takes on a value of d'. Microcontroller 26, which receives this information, is thus able to determine angular deformation f1, f2, . . . fn adopted by strap 7 during its deformation, and to deduce from this the flexion to which it is subject.

As represented in FIGS. 13 and 14, the means for measuring distance d could also consist of two electrodes 38 which constitute, with the air separating them as a dielectric, a capacitance the value of which depends on distance d separating them. Any flexion of strap 7 causes a flexion of sensor device 19 and the distance separating the two electrodes 38 increases and becomes equal to d'. The value of the existing capacitance between the two electrodes 38 is sent to microcontroller 26 which can deduce from it the value of distance d'. Knowing new separation d', microcontroller 26 can deduce from it the flexion adopted by strap 7.

Additionally, electronic circuit 20 contains communication means 40, in particular of the Bluetooth type, which can transmit to external receivers, in particular such as devices of the smartphone type, or receivers incorporated in the vehicle, and in particular to its dashboard, the parameters collected or data output from the analysis of these parameters, which are managed by microcontroller 26. These receiver devices may to this end have a specific application able to manage the data transmitted by communication means 40.

Another type of sensor device could also be used, for example one such as that represented in FIGS. 15 to 18.

As above, an electronic circuit 20, in particular of the type described above, is combined with a flexible, elastic strip 44, for example made of a compound of polyamide, polyether, polyester, isocyanate, etc. However, this strip 44 is sufficiently rigid that, when not subject to any stress, it can regain its rectilinear shape, as represented in FIG. 15. If necessary, of course, the stiffness of the flexible strip could be increased by combining it with a stiffer spring element made, for example, either of a synthetic material or of metal.

As described above, the assembly consisting of electronic circuit 20 and of sensor device 19 could also be installed in a receiver unit, not represented in the illustration, consisting of a flexible, deformable and elastic material.

Strip 44 is given, over its entire length, a coating 46 made of a specific polymer ink in which conducting particles are embedded which give it, when it is appreciably rectilinear, as represented in FIG. 15, a resistance of value R, and when it is bent, as represented in FIG. 17, a resistance of another value, in particular a higher value. Thus, according to the invention, one need merely measure the value of resistance R of impression 46 in order to be able to determine the curvature of strip 44, and therefore that of strap 7.

This measurement could be made by any other means and, in particular, as represented in FIG. 18, by means of a divider bridge 48 which can, in a known manner, apply to an input 50 of microcontroller 26 a voltage v which depends on resistance R of coating 46, and therefore on the flexion of strap 7.

According to the invention, case 18 as described above, which is made from a flexible, deformable material, must also have an elasticity such that when it is not subject to any stress it returns to a position called its "initial position", which is preferentially close to an appreciably rectilinear position, as represented in FIGS. 7, 10 and 15. Case 18 will have such an elasticity due to its constituent material and/or by being given spring elements, consisting in particular of elastic snap rings made of a synthetic material, which will preferentially be slipped on in appropriate longitudinal recesses made in the case.

An example of the operation of the invention will now be described. In FIG. 3, which represents seat 1 when empty, flexible case 18 containing sensor device 19, and consequently the reference axis of the inclinometer contained in it, forms relative to vertical yy' an angle i0, and this value is transmitted to microcontroller 26, which thus knows the value of the inclination parameter For its part, gyroscope 22 can detect any movement applied to seat 1, in particular when the user places a child 2 in it, and can transmit to microcontroller 26 the value of a "jolt parameter" g.

The same applies to accelerometer 25 of electronic circuit 20, which detects any jolt applied to the seat relative to the vehicle, and any movement of it in space, and which can transmit to microcontroller 26 the value of acceleration parameter a.

In practical terms, and although in the present mode of implementation of the invention it is considered that the inclinometer consists of a device distinct from the accelerometer, the latter can also be used to supply inclination parameter i, as explained below.

For each condition detected during a period of operation which may be, in particular, of the order of 10 seconds, microcontroller 26 establishes a table of values of the various sensors. Thus, in the idle condition, i.e. before a child has been put into seat 1, we shall for example have the following values:

Gyroscope 22: g=0
Accelerometer 25: a=0
Inclinometer 28: i=0
Sensor device 19: f=0

These various values are grouped by microcontroller 26 in a matrix the value of which will be represented by: [gaif], and it is communicated, via Bluetooth communication means 40, to the application contained in a receiver of the user which decodes it using an appropriate application, in particular a specific application in the case of a smartphone 56, and deduces from it that there is no child in the seat. Such a process can also of course be undertaken by microcontroller 26 itself.

When a child 2 is placed in seat 1, as represented in FIG. 4, gyroscope 22 and accelerometer 25 detect the jolts caused by this action to place the child in the seat, and the sensors' parameters then adopt the following values:

Gyroscope 22: g=1
Accelerometer 25: a=0
Inclinometer 28: i0
Sensor device 19: f0

The matrix of values thus becomes [1000] and is obtained by microcontroller 26 and then communicated by the latter to the receiver, which deduces from it that a child has indeed been put into seat 1 and that, since neither inclinometer 28 nor sensor device 19 have changed their values significantly, strap 7 has continued to be applied on the seat, and that consequently child 2 is not yet strapped in. The application then displays on the smartphone a message similar to "Child in the seat".

After this, as represented in FIG. 5, when strap 7 is passed over a shoulder of the child the values of inclinometer change and the parameters of the sensors then adopt the following values:

Gyroscope 22: g=1
Accelerometer 25: a=0
Inclinometer 28: i=1
Sensor device 19: f=0

The matrix of values then becomes equal to [1010] and is obtained by microcontroller 26 and communicated by it to the application. In this case the application observes, firstly, that an inclination has been detected, which means that this is higher than it should be if strap 7 were tight. The application also observes that a flexion has not been detected (f=0), implying that the strap has not been tightened. The application can consequently display, if desired, a message similar to: "Child not strapped in".

When, as represented in FIG. 6, retaining strap 7 is correctly tightened, the value of the flexion changes and flexion parameter f established by sensor device 19 becomes equal to 1. The sensors' parameters then adopt the following values:

Gyroscope 22: g=1
Accelerometer 25: a=0
Inclinometer 28: i=1
Sensor device 19: f=1

The matrix of values becomes equal to [1011] and is obtained by microcontroller 26 and communicated by it to the receiver. The latter's application observes that, apart from the acceleration parameter, which is still at 0 (meaning that the vehicle is stationary), all other parameters are at 1, meaning that the child is correctly strapped in. The application will consequently display a message similar to "Child correctly strapped in".

In a simplified embodiment of the invention one could also dispense with the redundancy of the inclination and flexion parameters and, to do so, use only one inclinometer or only one sensor device 19 to determine whether the child is correctly strapped in.

When the vehicle starts its movement is detected by accelerometer 25 and the acceleration parameter changes to 1. The sensors' parameters then adopt the following values:

Gyroscope 22: g=1
Accelerometer 25: a=1
Inclinometer 28: i=1
Sensor device 19: f=1

The matrix of values becomes equal to [1111] and is obtained by microcontroller 26 and communicated by it to the receiver. The latter's application can thus deduce that the vehicle is moving, and that the child is correctly strapped in.

Thus, while acceleration parameter a=1, the device knows that the vehicle is moving and if, during this period, or journey period, the child becomes detached, strap 7 will then be in a position close to the one represented in FIG. 3, and the values of the parameters then become:

Gyroscope 22: g=1
Accelerometer 25: a=1
Inclinometer 28: i=0
Sensor device 19: f=0

The matrix of values then becomes equal to [1100] and is obtained by microcontroller 26 and communicated to the receiver, which deduces that the vehicle is moving but that strap 7 has returned to its initial position, which implies that the child is detached. The application then sends an urgent alert to the user's receiver, which can be both acoustic and visual, similar to "Warning: child unstrapped".

If only the tightening buckle of the harness becomes detached, sensor device 19 would then, due to its inherent stiffness, regain an uncurved shape, and the flexion parameter would adopt value f=0. The values of the parameters then become:

Gyroscope 22: g=1
Accelerometer 25: a=1
Inclinometer 28: i=1
Sensor device 19: f=0

The matrix of values becomes equal to [1110] and is obtained by microcontroller 26 and communicated to the receiver, which deduces from it that the vehicle is moving, that strap 7 has indeed remained on the shoulder of the child, but that buckle 5 is unbuckled. The application then sends a message similar to "Warning: child unstrapped.

In an interesting manner, the checking device according to the invention can include means enabling the parameters of different child seat models to be recorded, in particular in microcontroller 26, and in particular value i0 of inclinometer 28 and value f0 of sensor device 19 corresponding to the situation represented in FIG. 3, i.e. when the seat is not occupied by a child.

In various variant embodiments of the present invention the reliability of the checking device can be improved by using several sensor devices in a single seat, these sensors being of the same type or of different types.

Thus, as represented in FIG. 19, the checking device according to the invention includes two sensor devices 19 and 19', which are installed respectively in the two retaining straps 7 and 9. These two sensor devices 19 and 19' each include two accelerometers 24a and 24b which are installed on flexible, elastic tongues 23, 23'. Each of sensors 19, 19' is in remote communication with microcontroller 26, via communication means 40, shown by a dotted line in the illustration. Microcontroller 26 can thus easily determine the respective flexion values f and f' of strips 23 and 23', and therefore those of each of straps 7 and 9, from the simple difference of the values delivered by the two inclinometers. Microcontroller 26 also includes discrimination means, of a known type, enabling the redundancy of the flexion values communicated by the two sensor devices 19, 19' installed on the two straps 7 and 9 to be processed in the event of conflicting values of the data communicated by them.

The checking device according to the invention can also include means enabling account to be taken automatically of the influence of the physical build of the child, and in particular their size, when they are in position in the seat, and when the retaining strap has been passed over their shoulder, as represented in FIGS. 23a to 23c.

The device can determine this situation, and therefore record the parameters of the various sensors, and these values can be used as references to detect a new situation. Firstly, the angle of inclination of the strap relative to horizontal is known by means of an inclinometer 24a located at one end of flexible case 18 of the device, and the value of this angle will vary according to the real or induced physical build of the child in the seat. Secondly, the curvature of this strap in the area of the child's shoulder and chest will be known by the value of the angle measured by sensor device 19. These values compared to the reference values stored in a matrix called an "adaptive matrix" enable the exact way the child is strapped in to be deduced, using appropriate algorithms.

More specifically, and as represented in FIG. 23a, for a child of median size, rear portion 7a of strap 7 will be slightly downwards inclined if headrest 30 of the seat is adjusted upwards and, conversely, it will be slightly upwards inclined if headrest 30 is adjusted downwards, in order to be roughly horizontal for a headrest adjusted to an intermediate position.

Below we shall consider angle A formed by rear portion 7a of strap 7 with a reference direction, which is given by sensor 24a, and angle B formed by front portion 7b of the latter, with the same reference direction, which is provided by sensor 24b. For a child of maximum size, i.e. the maximum size authorised by the legislation, and for a headrest 30 adjusted to maximum height, as represented in FIG. 23b, rear portion 7a of strap 7 is inclined upwards, and maximum flexion angle B-A of strap 7 is at its greatest possible value.

Conversely, for a small child, and for a headrest 30 adjusted to the minimum height, as represented in FIG. 23c, rear portion 7a of the strap is inclined downwards, and flexion angle B-A is at its lowest possible value.

Under these circumstances it is observed that rear portion 7a of strap 7 is indicative of the height adjustment of headrest 30, and that its front portion 7b is indicative of the child being correctly strapped in. According to the invention, between the two accelerometers 24a and 24b, as included in the embodiment illustrated in FIGS. 7 to 9, a third accelerometer 24c (FIG. 21a) is installed, which will enable microcontroller 26 to discriminate between the value of the flexion of rear portion 7a of strap 7 due to the adjustment of the headrest with reference to the size of the child with the flexion of the said front portion 7b which is indicative of the child being correctly secured.

The checking device according to the invention may also include means which, once the child is correctly strapped into the seat, as represented in FIG. 6, enable the values of the inclination and flexion parameters corresponding to this situation to be recorded, and these parameters will subsequently be used as a reference in the system to recognise whether or not the child is correctly secured in the seat. Actions shall thus proceed as explained above, i.e. by comparing the values observed by means of the sensors with the reference values recorded in the adaptive matrix.

FIG. 20 represents a flow chart showing an example operation of a checking device according to the invention.

Microcontroller 26 includes means to put the electronic unit which it controls into "sleep mode" when inclinometer 28 and sensor device 19 are not being used. When the user puts a child 2 in the seat gyroscope 22 is activated, and it transmits information to a counting loop which measures the amount of data which the gyroscope is sending to it over a given time, for example two seconds. Such an arrangement enables a filtering system to be created, enabling spurious detections to be eliminated. If this number of data elements is greater than a predefined value, for example 10 in the example represented in FIG. 20, microcontroller 26 calculates the average of the received values, and this average is then compared to a first threshold value gs, and if it exceeds this threshold value the gyroscope parameter is set at the value 1 (g=1), otherwise being set at the value 0 (g=0). This value of gyroscope parameter g is put into a memory 52 so that it may be combined with the values received by the other sensors, in order to form a data matrix of the following type: [gaif]. Thus, if gyroscope 22 is the only sensor which reacts the matrix of parameters will be: [1000].

This matrix is sent by microcontroller 26 via Bluetooth communication means 40 to a receiving application loaded, for example, in a smartphone 56.

The other sensors, i.e. accelerometer 25, inclinometer 28 and sensor device 19, include, as represented in FIG. 20, flow chart elements of the same type, such that if, in addition to the gyroscope, accelerometer 25 reacts and if, as above, the average value of the signals is higher than a second threshold value as, then acceleration parameter a becomes equal to 1 and the matrix of parameters becomes equal to: [1100].

Similar reasoning applies for inclinometer parameter i supplied by inclinometer 28 and for parameter f supplied by sensor device 19.

We shall consider below, as examples, the main situations which may occur during a process starting from the situation of a seat at rest until, once again, the seat returns to its "rest" state after the vehicle has accomplished a journey with the child.

| Situation | Matrix of parameters | Message |
|---|---|---|
| Seat at rest: | 0000 | |
| Child in the seat: | 1000 | Child in the seat |
| Strap passed over the shoulder: | 1010 | Child not strapped in |
| Harness tightened: | 1011 | Child correctly strapped in |
| Vehicle moving and strap unbuckled: | 1110 | ALERT: CHILD UNSTRAPPED |

| Situation | Matrix of parameters | Message |
|---|---|---|
| Vehicle stopped, child detached | 1000 | Child detached |
| Child has left the seat | 0000 | |

According to the invention, the remote receiver may, in addition to smartphone 56 mentioned above, consist of an object in the user's possession, and could for example consist of a key fob belonging to them.

In a simplified embodiment of the invention, microcontroller 26 will not be in communication with a remote receiver such as a smartphone, but will be able to transmit by itself the data for the user's attention, in particular by acoustic means. These warnings may consist of sounds of different kinds generated by one or more buzzers, or of voice messages emitted by a voice synthesiser associated with microcontroller 26.

In a variant of the present invention, a vibrator may be added to the device which, in an educational and preventative aim, will firstly alert the child, reminding them that they must not unstrap themselves when they are installed in their seat and when the vehicle is moving.

A presence sensor, for example a capacitive sensor, and in particular a sensor using the variation of capacitance of a loop which detects when a body having mass is brought within proximity of it, can be added to the device, to introduce redundancy into the sensors, such that the device meets the motor vehicle standard which requires that a defective sensor enables the system to continue to operate without danger. To this end, and as represented in FIG. 21*a*, sensor device 19 can include a capacitive antenna 54 which extends, for example, in the direction of the length of flexible tongue 23, and which enables microcontroller 26 to detect, possibly redundantly with gyroscope 22, the presence of a child in seat 1.

In a variant, and as represented in FIG. 21*b*, three capacitive antennae 54*a*, 54*b*, 54*c*, connected to microcontroller 26, have been installed on flexible tongue 23. These capacitive antennae, which may be installed between accelerometers 24*a* and 24*b*, enable microcontroller 26 to obtain a measurement of a capacitance relating to the presence of water in the body of the child through the latter's clothing, which is representative of the distance between this sensor and the child's body. Thus, if the child is correctly strapped in, case 18 containing sensor device 19 is located almost parallel to the child's body in this location, such that the capacitive measurements provided by the three capacitive antennae 54*a*, 54*b* and 54*c* will be close to one another, independently of the other implied factors such as, in particular, the thickness of the child's clothing, or whether they are dressed lightly in a T-shirt or in a thick cloak. If this is not the case microcontroller 26 will have data in addition to that of the other sensors, indicating that the way the child is strapped in, and therefore the way they are secured, are not correct.

According to the invention the application controlling microcontroller 26 may include a self-test program which will be run each time the car seat is used, in particular after a prolonged stop.

In a variant of the present invention the inclinometer will consist of the accelerometer itself, which will thus be able to provide, firstly, the actual acceleration of the vehicle, in three axes xx', yy', zz', and also the inclination of case 18 containing electronic circuit 20 and sensor device 19. This being so, the flow chart relating to accelerometer 25 and to inclinometer 28 is replaced by the one represented in FIG. 22.

Of course, and as mentioned above, the signal processing means may include electronic elements able to transmit the alarm signal remotely, for example via a Bluetooth link 40 to smartphone 56 of the user, by means of a dedicated application of this smartphone. The means for processing the signal could also transmit the alarm signal to an object belonging to the user, in particular by means of a link of the radio frequency type. They could also transmit the alarm signal to receiver elements which are securely attached to the motor vehicle's dashboard.

The present invention is particularly interesting in that the present checking device can be installed on any seat, whatever its type or trademark, with no requirement, unlike the devices of the prior state of the art, to accomplish any technical adaptation whatsoever on the seat.

This being the case, manufacturers of child seats can thus install the checking device on the various models of their range of existing seats without modification, and users can also use the checking device on various seats owned by them, without modification.

The system according to the invention proves to be particularly easy to install, since to use it one need merely attach it to the upper portion of one of the straps, i.e. in an area close to that area where the said strap passes through the back of the seat.

Although the checking device according to the present invention proves to be particularly interesting when checking the satisfactory operational and tension condition of a child's car seat harness, it could also be used in other fields where it is necessary to hold an occupant in a seat under correct safety conditions.

Such a seat could, of course, be a seat intended for an adult, and could consist not only of a car seat, but also of a seat of the type used in other means of locomotion, and in particular in the aviation field.

The strap holding an occupant in a seat could also be something other than a shoulder strap, and could in particular be a lap belt.

The invention claimed is:

1. A device for checking that a securing harness, for a safety seat, including at least one retaining strap subjected to tension when the harness is in the state of holding an occupant, is in a correct operational condition, wherein said device is configured to be installed in a determined area of the strap, the device comprising:
   at least one sensor device including an elongated, flexible element which is positionable on said strap in said determined area, which has measuring means able to measure, in said determined area, at least one level of flexion and/or inclination of said strap,
   means able to obtain values relating to the level of flexion and/or inclination,
   internal or external means able to analyse the values and to communicate to receiver means data concerning the operational condition of said securing harness.

2. The checking device according to claim 1, wherein the retaining strap is a shoulder strap.

3. The checking device according to claim 2, wherein said determined area is close to a location where it is intended for the strap to be pressing against the shoulder of the occupant.

4. The checking device according to claim 1, wherein the sensor device is associated with an electronic circuit, and the elongated, flexible element is attached to it, both of these elements being contained in a flexible, elastic envelope so as to form a module which can be immobilised relative to the strap.

5. The checking device according to claim 4, wherein one end of the device includes means able to attach it, to a headrest of the child seat.

6. The checking device according to claim 4, wherein the flexible envelope has elasticity such that, when the flexible envelope is under no stress, the flexible envelope has an unbent shape.

7. The checking device according to claim 6, wherein the elasticity of the flexible envelope is communicated to it, at least partly, by an additional spring element.

8. The checking device according to claim 7, wherein the additional spring element consists of at least one snap ring made of synthetic fibre.

9. The checking device according to claim 1, further comprising electronic management means containing a program to control the various sensors.

10. The checking device according to claim 1, further comprising means for remote communication with receiver means.

11. The checking device according to claim 1, further comprising one or more sensors configured to output data based on the physical characteristics of the occupant.

12. A sensor device configured to implement a checking device for checking that a securing harness, for a safety seat, including at least one retaining strap subjected to tension when the harness is in the state of holding an occupant, is in a correct operational condition, said checking device configured to be installed in a determined area of the strap, the checking device comprising said sensor device, means able to obtain values relating to a level of flexion and/or inclination of the strap, and internal or external means able to analyse the values and to communicate to receiver means data concerning the operational condition of said securing harness, the sensor device comprising an elongated, flexible element which is positionable on said strap in said determined area, which has measuring means able to measure, in said determined area, said level of flexion and/or inclination of said strap.

13. The sensor device according to claim 12, wherein the sensor device is integrated in the retaining strap.

14. The sensor device according to claim 12, wherein said measuring means include at least one inclination sensor.

15. The sensor device according to claim 14, wherein the at least one inclination sensor consists of an accelerometer.

16. The sensor device according to claim 12, wherein the sensor device includes two inclinometers installed roughly at respective ends of the elongated, flexible element, wherein a difference between the two values delivered by the two inclinometers gives a value of the level of flexion of the strap.

17. The sensor device according to claim 16, wherein at least one other inclinometer is installed between the two inclinometers.

18. The sensor device according to claim 12, wherein the elongated, flexible element includes, at one end, a target in which one area becomes separated from a reference area when it is subjected to flexion, and wherein measuring means are installed to measure the distance between the target and said reference area.

19. The sensor device according to claim 18, wherein the flexible element is formed from an elongated sheath, an upper wall and lower wall of which are kept apart by separating elements, with the target installed in a portion of the sheath distant from the strap.

20. The sensor device according to claim 18, wherein the measuring means include a laser diode device.

21. The sensor device according to claim 19, further comprising two electrodes installed on the target and in the reference area which constitute a capacitance with the air which separates them as a dielectric, and also means for measuring the value of the capacitance.

22. The sensor device according to claim 12, wherein the flexible, elongated element is covered with a coating, such that its electrical resistance varies when it is bent.

23. The sensor device according to claim 22, wherein the elongated, flexible element is covered with a coating containing embedded conducting particles which, when it is appreciably rectilinear, give it a given resistance and, when it is curved, a resistance of another value.

24. The sensor device according to claim 22, further comprising means to measure the value of said resistance.

25. The sensor device according to claim 12, wherein the elongated, flexible element includes at least one capacitive sensor.

26. A safety seat comprising a checking device according to claim 1.

* * * * *